US012241293B2

(12) United States Patent
Roup et al.

(10) Patent No.: US 12,241,293 B2
(45) **Date of Patent: *Mar. 4, 2025**

(54) QUICK INSTALL METHOD AND APPARATUS FOR DOOR LOCKS

(71) Applicant: Schlage Lock Company LLC, Carmel, IN (US)

(72) Inventors: Austin M. Roup, Woodland Park, CO (US); Kenton H. Barker, Colorado Springs, CO (US)

(73) Assignee: Schlage Lock Company LLC, Carmel, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/242,263

(22) Filed: Sep. 5, 2023

(65) Prior Publication Data

US 2024/0254804 A1 Aug. 1, 2024

Related U.S. Application Data

(63) Continuation of application No. 17/176,822, filed on Feb. 16, 2021, now Pat. No. 11,746,562, which is a (Continued)

(51) Int. Cl.
*E05B 9/08* (2006.01)
*E05B 3/06* (2006.01)
(Continued)

(52) U.S. Cl.
CPC .............. *E05B 9/082* (2013.01); *E05B 3/065* (2013.01); *E05B 9/02* (2013.01); *E05B 17/0012* (2013.01); *E05C 9/1833* (2013.01)

(58) Field of Classification Search
CPC ... E05B 3/00; E05B 3/003; E05B 3/04; E05B 3/06; E05B 3/065; E05B 9/00; E05B 9/02;
(Continued)

(56) References Cited

U.S. PATENT DOCUMENTS 1,297,539 A 3/1919 Bull
2,027,608 A 1/1936 Moller
(Continued)

FOREIGN PATENT DOCUMENTS

CA 2434017 A1 12/2004
CN 2680791 Y 2/2005
(Continued)

OTHER PUBLICATIONS

Hoppe AG Hoppe Quick-Fit Plus brochure (7 pages).
(Continued)

*Primary Examiner* — Christopher J Boswell
(74) *Attorney, Agent, or Firm* — Taft Stettinius & Hollister LLP

(57) ABSTRACT

The present disclosure is directed to a lock assembly comprising an inner housing positionable on one side of a movable structure such as a door and an outer housing positionable on an opposing side of the structure. A pocket connection region having an aperture formed through a wall of the inner housing is configured to receive a head of a fastener therethrough. After the fastener extends through the aperture, a clamp device may be moved from an open position to a closed position so as to releasably lock the fastener to the pocket connection region of the inner housing. In another form, a retainer is configured to hold the fastener with respect to the inner housing during installation of the lock assembly. In this manner an inner housing may be quickly connected to an outer housing when installing a lock assembly to the structure.

20 Claims, 19 Drawing Sheets

Related U.S. Application Data continuation of application No. 15/958,717, filed on Apr. 20, 2018, now Pat. No. 10,920,452.

(51) Int. Cl.
*E05B 9/02* (2006.01)
*E05B 17/00* (2006.01)
*E05C 9/18* (2006.01)

(58) Field of Classification Search
CPC ........ E05B 9/08; E05B 9/082; E05B 17/0012; E05C 9/1833
See application file for complete search history.

(56) References Cited

U.S. PATENT DOCUMENTS

| | | | | |
|---|---|---|---|---|
| 2,759,754 | A | 8/1956 | Kaiser | |
| 2,810,600 | A | 10/1957 | Marron | |
| 3,157,215 | A | 11/1964 | Zahodiakin | |
| 3,192,820 | A | 7/1965 | Pitzer | |
| 3,210,976 | A * | 10/1965 | Best | E05B 55/005 70/451 |
| 4,428,212 | A | 1/1984 | Best et al. | |
| 4,471,984 | A | 9/1984 | Bellantuono | |
| 5,100,275 | A | 3/1992 | Schirrmacher | |
| 5,118,152 | A | 6/1992 | Lin | |
| 5,409,278 | A | 4/1995 | Harcourt | |
| 5,411,303 | A * | 5/1995 | To | E05B 3/06 292/357 |
| 5,727,406 | A | 3/1998 | Banducci | |
| 6,048,007 | A | 4/2000 | Shor | |
| 6,223,572 | B1 | 5/2001 | Marttinen | |
| 6,302,457 | B1 | 10/2001 | Shen | |
| 6,364,383 | B1 | 4/2002 | Shen | |
| 6,532,629 | B2 * | 3/2003 | Armstrong | E05B 3/06 292/355 |
| 6,598,440 | B1 * | 7/2003 | Armstrong | E05B 55/005 292/336.3 |
| 6,681,605 | B1 | 1/2004 | Huang | |
| 6,745,602 | B2 | 6/2004 | Nakasone et al. | |
| 6,979,029 | B2 * | 12/2005 | Shen | E05B 15/02 292/336.5 |
| 7,347,463 | B2 | 3/2008 | Blight | |
| 7,571,941 | B2 | 8/2009 | Chang | |
| 7,686,357 | B2 | 3/2010 | Engel et al. | |
| 8,683,833 | B2 | 4/2014 | Marschalek et al. | |
| 8,960,740 | B2 | 2/2015 | Huang et al. | |
| 9,322,201 | B1 | 4/2016 | Cheng et al. | |
| 10,920,450 | B2 | 2/2021 | Horiuchi | |
| 10,920,452 | B2 | 2/2021 | Roup et al. | |
| 11,091,934 | B2 | 8/2021 | Roup et al. | |
| 11,746,562 | B2 * | 9/2023 | Roup | E05C 9/1833 70/224 |
| 11,933,092 | B2 * | 3/2024 | Zhao | E05B 47/0012 |
| 2002/0096893 | A1 | 7/2002 | Wu | |
| 2004/0245788 | A1 | 12/2004 | Lin | |
| 2006/0237975 | A1 | 10/2006 | Hsueh | |
| 2009/0146439 | A1 | 6/2009 | Watts et al. | |
| 2012/0267903 | A1 | 10/2012 | Welsby et al. | |
| 2015/0069769 | A1 | 3/2015 | Chen | |
| 2018/0010362 | A1 | 1/2018 | Terei et al. | |

FOREIGN PATENT DOCUMENTS

| | | | |
|---|---|---|---|
| CN | 201386424 | Y | 1/2010 |
| CN | 101748929 | A | 6/2010 |
| WO | 2016146272 | A1 | 9/2016 |

OTHER PUBLICATIONS

International Search Report; International Searching Authority; International Application No. PCT/US2019/028528; Sep. 24, 2019; 4 pages.
Written Opinion; International Searching Authority; International Application No. PCT/US2019/028528; Sep. 24, 2019; 6 pages.
Chinese Office Action; National Intellectual Property Administration, People's Republic of China; Chinese Patent Application No. 201980041083.X; May 12, 2021; 6 pages.

* cited by examiner

QUICK INSTALL METHOD AND APPARATUS FOR DOOR LOCKS

CROSS-REFERENCE TO RELATED APPLICATIONS

The present application is a continuation of U.S. patent application Ser. No. 17/176,822 filed Feb. 16, 2021 and issued as U.S. Pat. No. 11,746,562, which is a continuation of U.S. patent application Ser. No. 15/958,717 filed Apr. 20, 2018 and issued as U.S. Pat. No. 10,920,452, the contents of which are hereby incorporated by reference in their entirety.

TECHNICAL FIELD

The present disclosure generally relates to a lock apparatus and more particularly, but not exclusively to a method for assembling a lock apparatus to a door or the like.

BACKGROUND

Lock mechanisms with lever actuators are connected to movable structures such as doors or windows and the like to prevent unauthorized opening of the structure. Typically, lock mechanisms require fasteners to install portions thereof to either side of the movable structure. Some prior art lock mechanisms can be difficult and/or time consuming to install. Accordingly, there remains a need for further contributions in this area of technology.

SUMMARY

One embodiment of the present disclosure includes a lock apparatus with a device to secure a fastener to a housing. Other embodiments include apparatuses, systems, devices, hardware, methods, and combinations for releasably holding a fastener to a housing during assembly with an opposing housing on an opposite side of a door. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
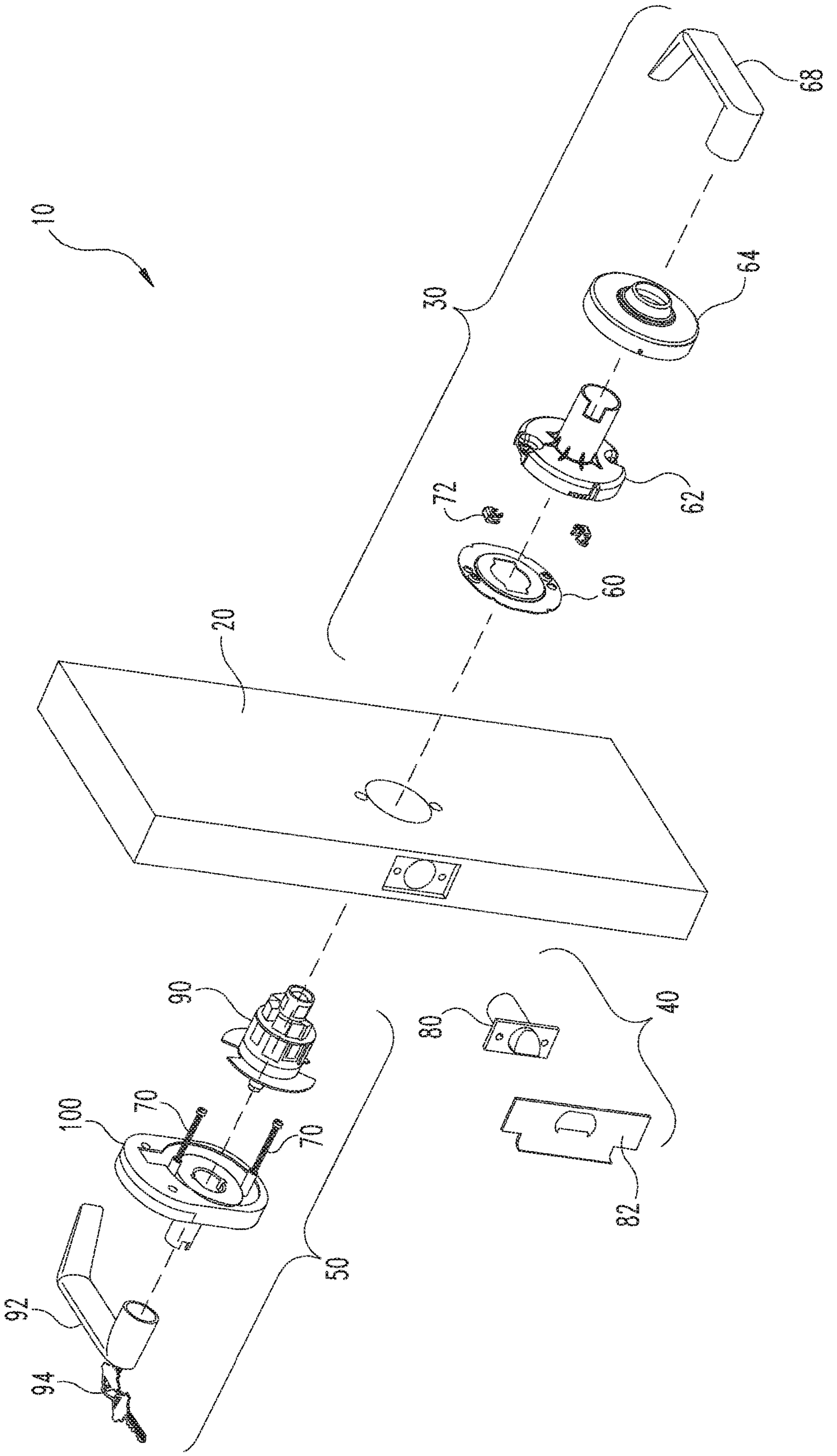
FIG. 1 is an exploded perspective view of a portion of a lock assembly according to one embodiment of the present disclosure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a lock assembly 10 according to the present disclosure is illustrated therein. The lock assembly 10 can be configured for a door 20 or similar moveable structures that are selectively locked to fixed structures. The lock assembly 10 can include an inner trim assembly 30, a latch assembly 40, and an outer trim assembly 50. The inner trim assembly 30 can include an inner plate 60 operably connected between the door 20 and an inner housing 62. In some forms, the inner housing 62 can be a spring cage housing, however, the inner housing 62 in this embodiment as well as other disclosed embodiments are not limited as such. An inner lever or handle 68 can be connected to the inner housing 62 after the inner and outer housing 62, 100 are connected to the door 20. An escutcheon rose 64 may be positioned around the inner housing 62. The latch assembly 40 can include one or more latches 80 and a latch plate 82 connected to fixed structure (not shown) as is commonly known to those skilled in the art.

The outer trim assembly 50 can include a lock mechanism 90 that is operable to lock and unlock the door 20. An outer lever 92 can be connected through an outer housing 100 and the lock mechanism 90 to the inner handle 68. The lock mechanism 90 can include mechanical locking mechanisms as well as electronic mechanisms including electronic controllers, sensors and motors as is known to those skilled in the art. A key 94 can be used to unlock the lock mechanism 10 as is conventional.

Figure 2:
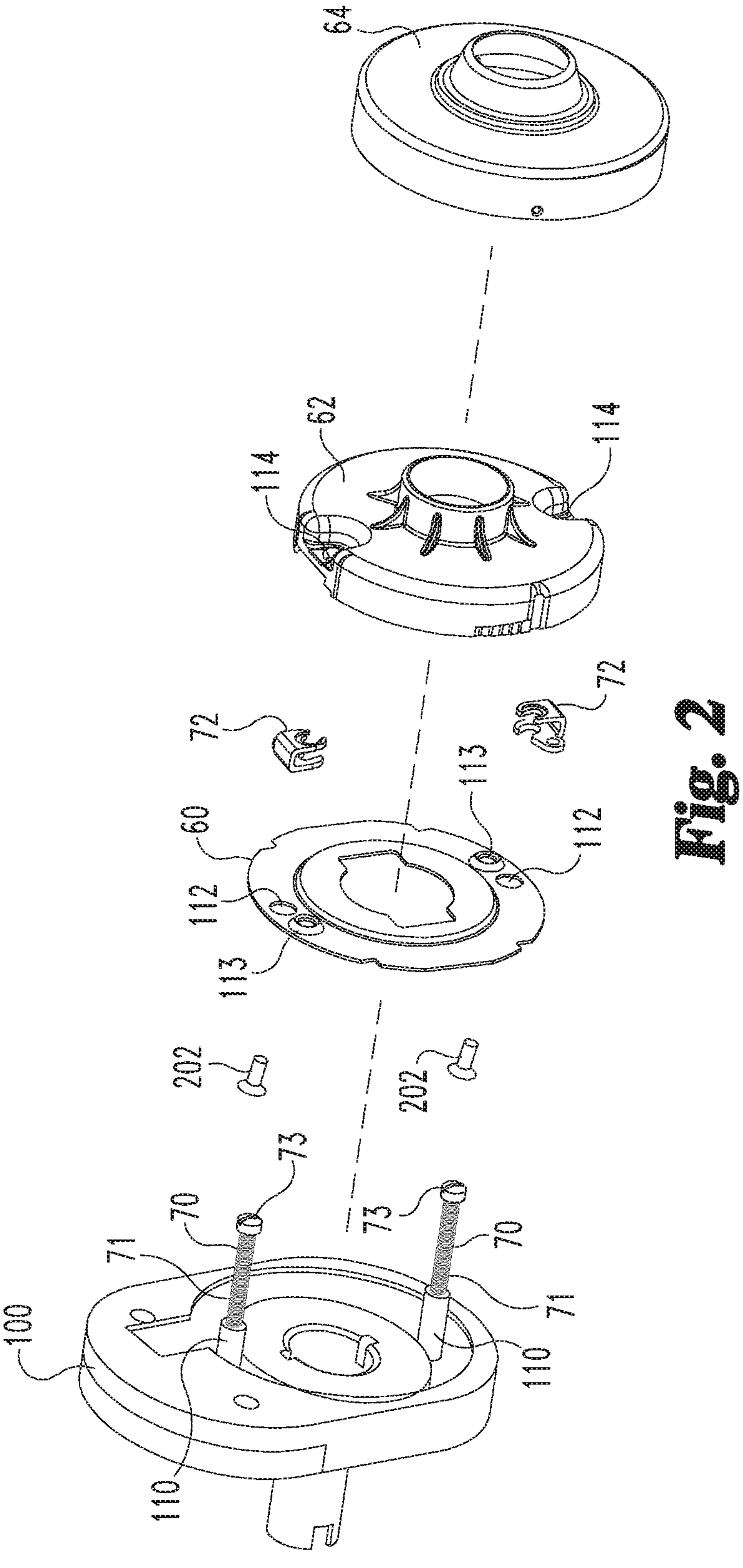
FIG. 2 is an exploded perspective view of a portion of the lock assembly of FIG. 1.

Referring now to FIG. 2, the inner plate 60 can be fastened to the inner housing 62 via first and second plate screws 202 prior to assembly to the door 20. First and second plate screws 202 can extend through apertures 113 of the inner plate 60 and into receiving bores (not shown) within the inner housing 62. The inner plate 60 can be attached to the inner housing 62 using other methods such as, without limitation, retaining rings, pins, riveting, staking, crimping, gluing, brazing, press-fitting or welding. The outer housing 100 can include one or more bosses 110 configured to threadingly receive a fastener 70 therein before assembly to the door 20. Each fastener 70 can include a threaded shank 71 with a head 73 formed at one end thereof. Each fastener 70 can be pre-threaded into the boss 110 a desired amount and then positioned through the door 20 (FIG. 1) such that the head 73 extends through an aperture 112 in the inner plate 60 and an aperture 114 in the inner housing 62. The fasteners 70 can be fixed to the inner housing 62 with a pivot clamp 72. The pivot clamp 72 permits the inner and outer housings 62, 100 to be quickly fastened to the door without positioning a fastener 70 through the inner housing 62 and then threading the fastener 70 into the outer housing 100. After closing the pivot clamp 72 about the head 73 of the fastener 70, the fastener 70 will be trapped and prevented from being removed from the inner housing 62. The screws 70 are then tightened to clamp the lock assembly 10 to the door 20.

Figure 3:
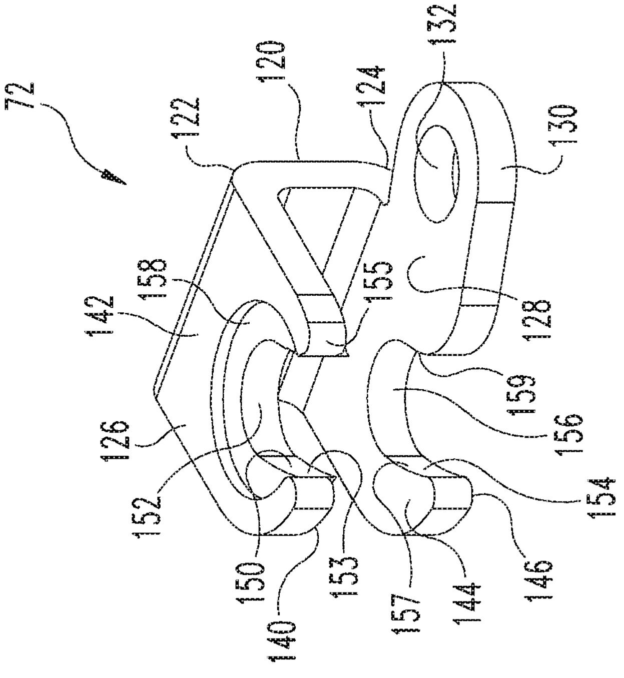
FIG. 3 is a perspective view of a pivot clamp device according to one embodiment of the present disclosure.

Referring now to FIG. 3, an enlarged perspective view of the pivot clamp device 72 is illustrated therein. The pivot clamp device 72 can include a top wall 120 extending between a first side 122 and a second side 124. A first side wall 126 extends from the first side 122 of the top wall 120 and a second side wall 128 extends from the second side 124 of the top wall 120. The second side wall 128 can include a leg extension 130 that includes a pivot hinge aperture 132 formed therethrough. The pivot hinge aperture 132 is pivotably connectable to the inner housing 62 (see FIG. 2) so as to lockingly engage with a fastener 70 (see FIG. 2) when pivoted to a closed position.

The first side wall 126 includes an inner surface 140 and an outer surface 142. The second side wall 128 includes an inner surface 144 and an outer surface 146. A first slot 150 can be formed within the first side wall 126. The first slot 150 can include a counterbore feature 158 formed in the outer surface 142 thereof to accommodate a portion of a head 73 of a fastener 70. The slot 150 can include first and second legs 153, 155 spaced apart so as to receive a portion of a fastener 70 therethrough. The legs 153, 155 can extend to an arcuate portion 152 positioned therebetween that defines a shape suitable to receive a portion of the shank 71 of fastener 70.

The second side wall 128 can include a slot 154 having a first leg 157 spaced apart from a second leg 159 to provide a space for a portion of the shank 71 of a fastener 70 to slidingly engage therethrough. An arcuate portion 156 can extend between the first and second leg 157, 159 to define a shape suitable for receiving a portion of the fastener 70 therethrough.

Figure 4:
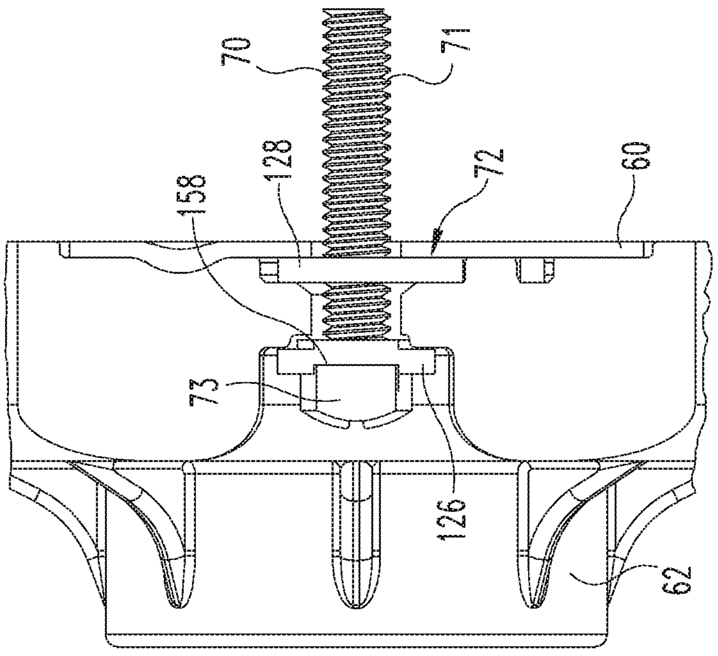
FIG. 4 is a top view of a portion of the pivot clamp device assembled with an inner housing.

Referring now to FIG. 4, a partial cross-sectional view of the inner housing 62 is shown with a fastener 70 assembled with and the pivot clamp device 72 connecting to the fastener 70. A portion of the pivot clamp device 72 is removed in this cross-sectional view to show the first side wall 126 and the second side wall 128 clamped about portions of the shank 71 of the fastener 70. The counterbore 158 of the pivot clamp device 72 can receive a portion of the head 73 of the fastener 70 to prevent rotation of the pivot clamp device 72 once the screw 70 is tightened to clamp the lock assembly 10 to the door 20.

Figure 5:
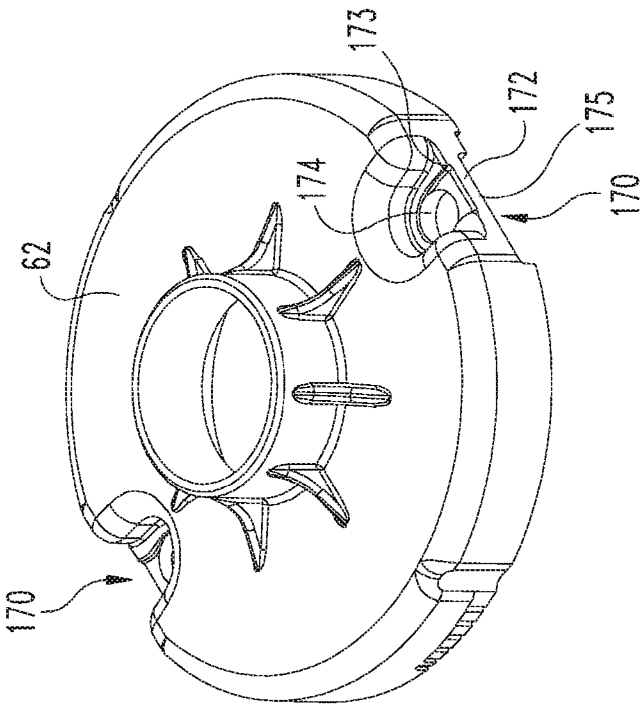
FIG. 5 is a top perspective view of the inner housing of FIG. 4.

Referring now to FIG. 5, a top perspective view of the inner housing 62 having a pocket connection region 170 is illustrated. The pocket connection region 170 can include a rib 172 that extends across a portion thereof. The rib 172 having opposing sides 173, 175 can be positioned such that the first side wall 126 and the second side wall 128 of the pivot clamp device 72 will engage about either of the opposing sides 173, 175 when the pivot clamp device 72 is closed. An aperture 174 is formed through the pocket connection region 170 and is configured to receive a portion of the fastener 70 therethrough during assembly.

Figure 6:
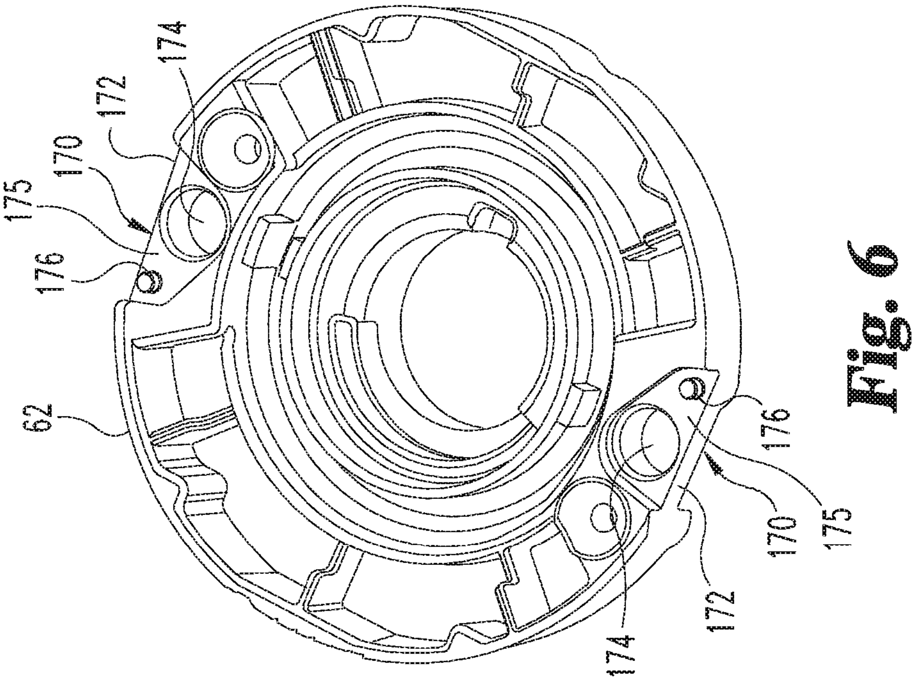
FIG. 6 is a bottom perspective view of the inner housing of FIG. 4.

Referring now to FIG. 6, a bottom perspective view of the inner housing 62 is illustrated. The pocket connection region 170 includes a pivot pin 176 extending therefrom so as to form a pivot connection for the pivot hinge aperture 132 (see FIG. 3) of the pivot clamp device 72. The pivot clamp device 72 pivots about the pivot pin 176 between open and closed positions. The pivot clamp device 72 is held in position on the pivot pin 176 by the plate 60 which is fastened to the housing 62 by the plate screws 202.

Figure 8:
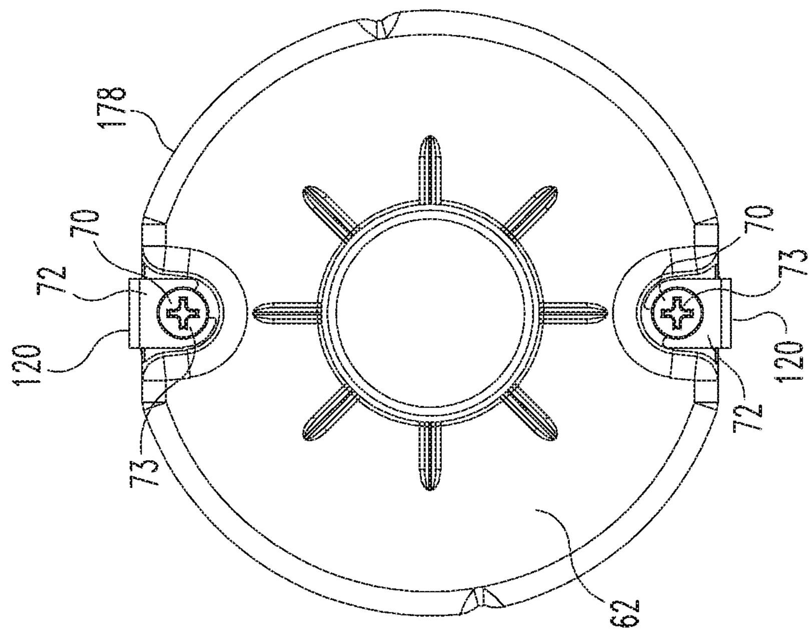
FIG. 8 is a top plan view of the inner housing with pivot clamp devices in a closed position.
Figure 7:
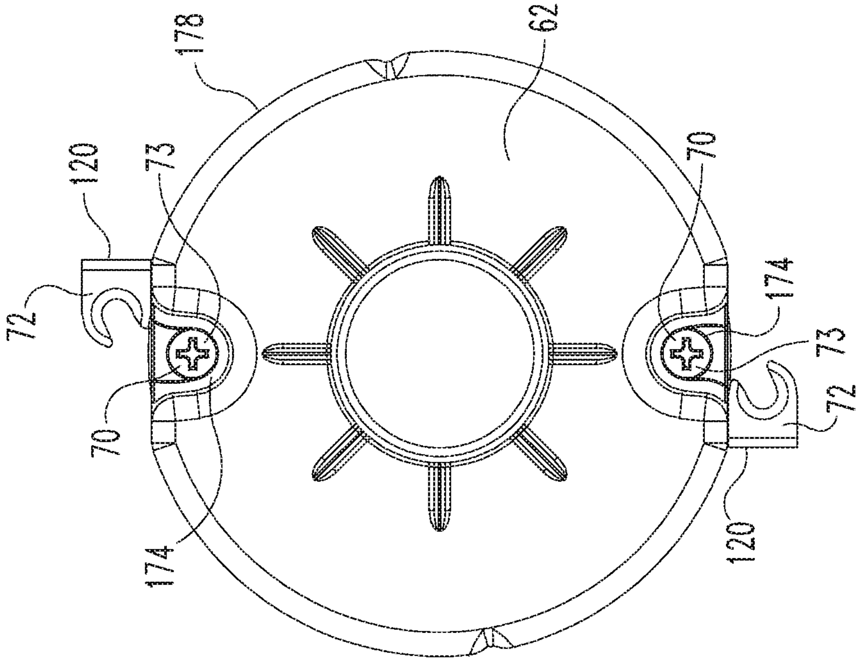
FIG. 7 is a top plan view of the inner housing with pivot clamp devices in an open position.

Referring now to FIG. 7, the inner housing 62 includes an outer perimeter wall 178 extending thereabout. When the pivot clamp device 72 is in an open position, the fastener 70 can slidingly engage through the aperture 174 of the inner housing 62. After the fastener 70 is positioned through the aperture 174, the pivot clamp device 72 can be pivoted to a closed position under the head 73 of the fastener 70 as shown in FIG. 8. The fastener 70 is then tightened into the counterbore 158 of the pivot clamp device 72 to prevent rotation of the pivot clamp device 72 and to clamp the lock assembly 10 to the door 20. In the open position, the pivot clamp device 72 extends outward of the outer perimeter wall 178. This feature provides a fail-safe assembly method because the escutcheon rose 64 (see FIG. 1) is prevented from being positioned over the inner housing 62 when the pivot clamp device 72 is open. In a closed position, the top wall 120 of the pivot clamp device 72 is positioned within the footprint of the outer perimeter wall 178, and thus will permit the escutcheon rose 64 to be assembled with the inner housing 62. The pivot clamp device 72 may form a press fit between the first and second side walls 126, 128 (see FIG. 3) and the opposing sides 173, 175 of the rib 172 of the pocket connection region 170 to hold the pivot clamp device 72 in the closed position until the head 73 of the fastener 70 is tightened into the counterbore 158 of the pivot clamp device 72 to prevent rotation of the pivot clamp device 72 (see FIGS. 5 and 6).

Figure 9:
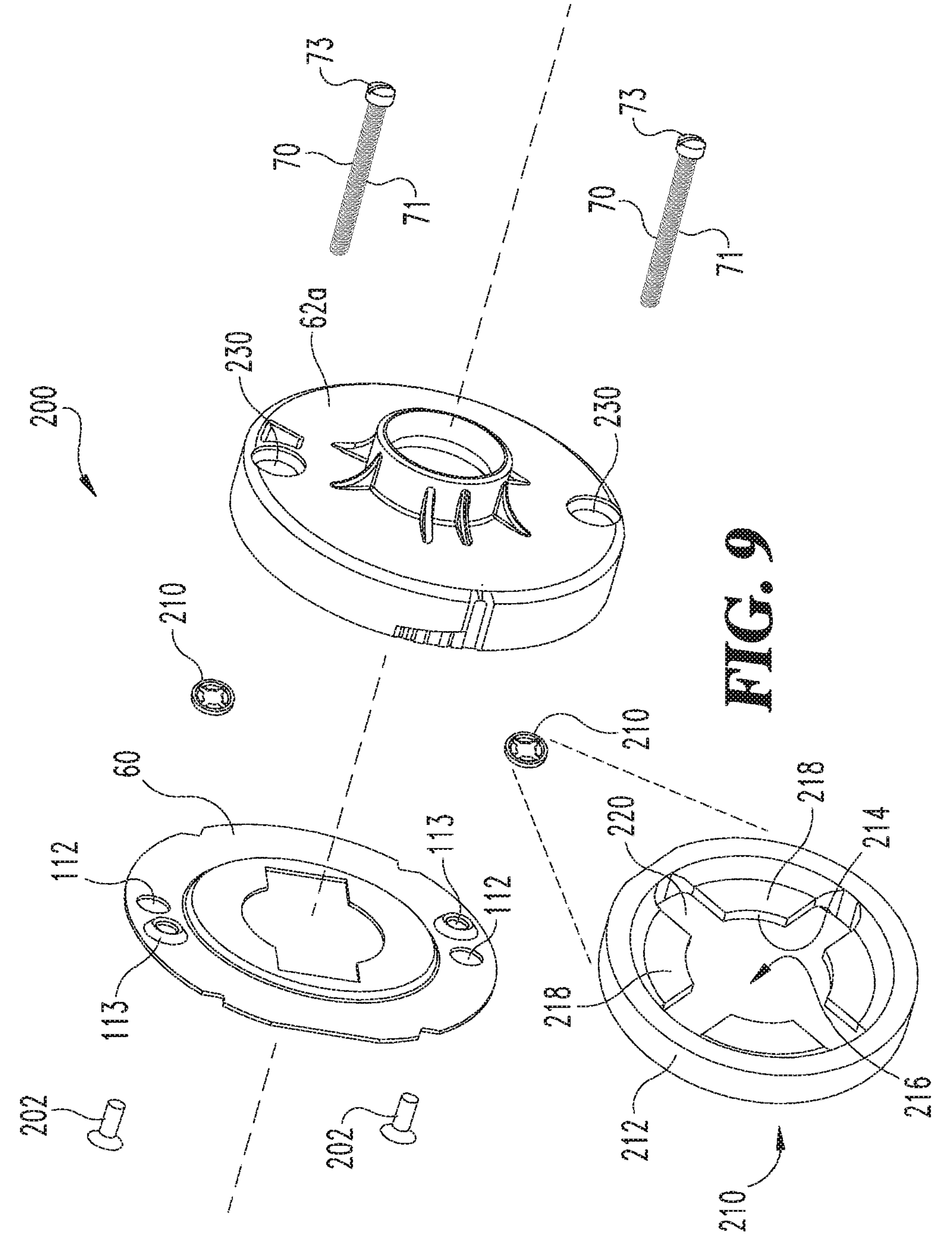
FIG. 9 is an exploded perspective view of a portion of a lock assembly according to another embodiment of the present disclosure.

Referring now to FIG. 9, an exploded perspective view of a portion of a lock assembly 200 according to another embodiment is illustrated therein. The lock assembly 200 includes many of the same features of the lock assembly 10 (shown in FIG. 1), and certain of those features will not be further discussed in this embodiment or other embodiments disclosed herein. The lock assembly 200 includes an inner housing 62*a* and an inner plate 60 similar to that illustrated in the previous embodiment. One or more fasteners 70 can extend through an aperture 230 formed through the inner housing 62*a* and can be held in place with a retainer ring 210 while assembling the inner housing 62*a* to an outer housing 100 (see FIG. 1) on opposing side of a door 20. The retainer ring 210 can include an outer rim 212 and an intermittent inner rim 214 radially inward of the outer rim 212. The inner rim 214 is formed with a plurality of tabs 218 that define a through aperture 216 therewith. The tabs 218 project radially inward from the outer rim 212 and may include a slot 220 formed between each adjacent pair of tabs 218 to permit flexibility and tolerance capability when assembling a fastener 70 through the inner rim 214.

Figure 10:
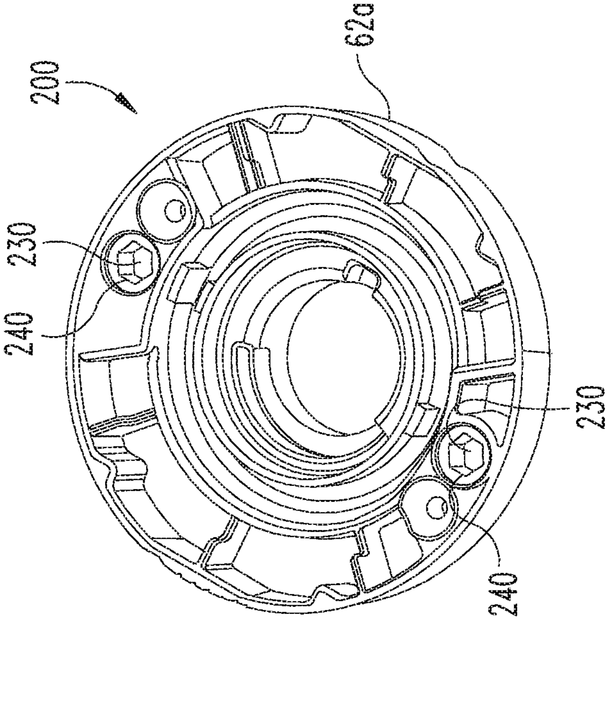
FIG. 10 is a bottom perspective view of an inner housing for the lock assembly of FIG. 9.

Referring now to FIG. 10, a bottom perspective view of the inner housing 62*a* that is configured for use with the lock assembly 200 is illustrated therein. The inner housing 62*a* can include a retainer pocket 240 formed about the apertures 230 and is configured to hold a retainer ring 210 (not shown) therein.

Figure 11:
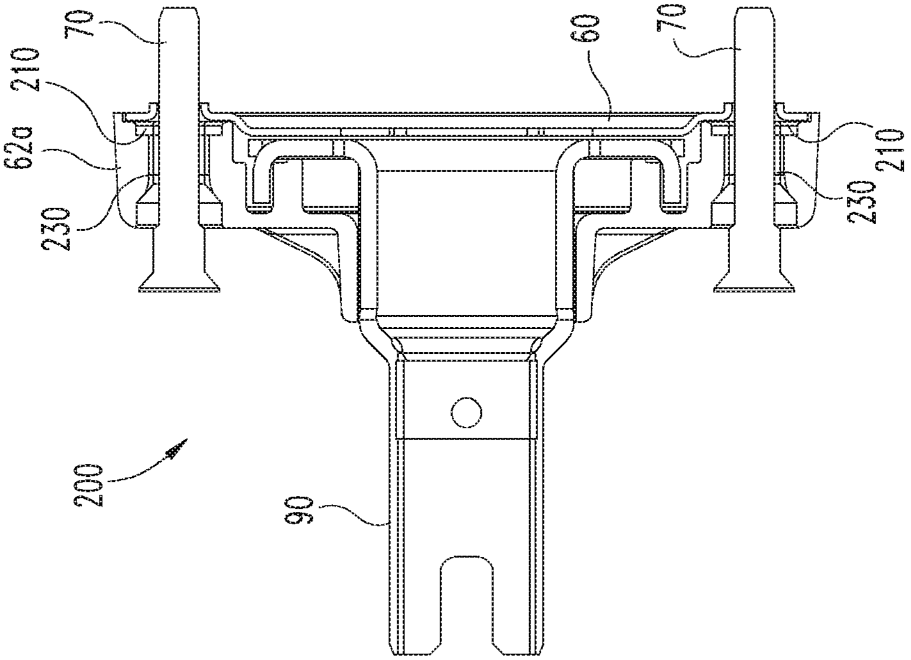
FIG. 11 is a cross-sectional view of the inner housing of FIG. 10 with fasteners and retaining clips assembled therewith.

FIG. 11 is a cross-sectional view of the inner housing 62*a* with the inner plate 60 assembled thereto. A fastener 70 is positioned through each of the apertures 230 and a corresponding retainer ring 210 configured to hold the fastener 70 during assembly of the lock assembly 200 with a door 20. The retainer rings 210 are operable for holding the fasteners 70 in a desired location relative to the inner housing 62*a* prior to assembly with the outer housing 100 (see FIG. 1). The fasteners 70 extend from the inner housing 62*a* such that they can then be inserted through a door 20 and into an outer housing 100 when the inner housing 62*a* is installed with the door 20. Because the fasteners 70 are set in a pre-assembly position with respect to the inner housing 62*a*, they can be readily inserted into a threaded boss receiver 110 in the outer housing 100. In this manner, a simplified method is provided for installing the lock assembly 200 to the door 20.

Referring now generally to FIGS. 12A-12E, an exploded perspective view of a portion of another lock assembly 300 is illustrated. The lock assembly 300 can include a slide clamp 310 operable to releasably hold a fastener 70 in position with respect to an inner housing 62*b*. The slide clamp 310 (best seen in FIG. 12B) can include a top wall 320 extending laterally from a first side 322 to a second side 324. A first side wall 326 can extend from the first side 322 of the top wall 320 and a second side wall 328 can extend from the second side 324 of the top wall 320. In one form, the first and second side walls 326, 328 can be substantially parallel to one another, however, in other forms the two side walls 326, 328 may be formed with an angle sufficient to provide for a press fit connection between the slide clamp 310 and a rib 372 (see FIG. 12A) of the inner housing 62*b* when the slide clamp 310 is in a closed position. The second side wall 328 can include a first leg 330*a* and a second leg 330*b* spaced apart from one another along a length of the top wall 320. A first guide slot 332*a* can be formed through a portion of the first leg 330*a* and a second guide slot 332*b* can be formed through a portion of the second leg 330*b*. The first and second guide slots 332*a*, 332*b* extend between first and second ends 382 and 384, respectively.

The first side wall 326 can include an inner surface 340 and an opposing outer surface 342 formed on either side thereof. The second side wall 328 can include an inner surface 344 and an outer surface 346 formed on opposing sides thereof. A first fastener slot 352 can be formed in the first side wall 326 to permit a shank 71 of a fastener 70 to slidingly engage therewith during installation. The first fastener slot 352 can include a first leg 353 spaced apart from a second leg 355 on either side thereof. An arcuate portion 357 extends between the first and second legs 353, 355 to form a shape suitable for receiving a shank 71 of the fastener 70. A counterbore feature 358 can be formed in the outer surface 342 thereof to accommodate a portion of a head 73 of a fastener 70. A second fastener slot 354 can be formed in the second side wall 328 to provide a region for the fastener 70 to slidingly engage therewith during installation. The second fastener slot 354 can include a first leg portion 360 spaced apart from a second leg portion 362 with an arcuate portion 364 extending therebetween to form a shape suitable for receiving a shank 71 of the fastener 70.

Figure 12A:
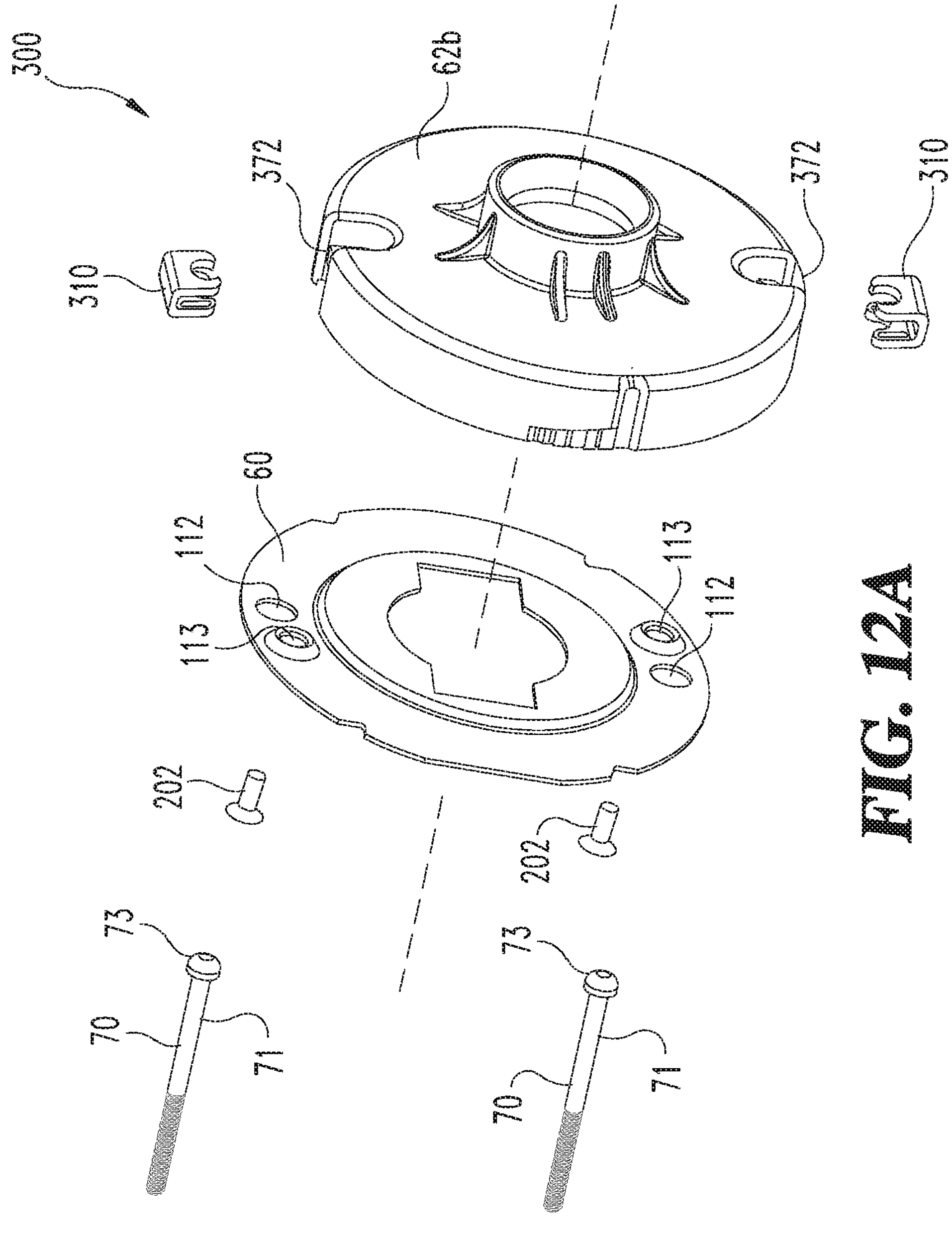
FIG. 12A is an exploded perspective view of a portion of a lock assembly according to another embodiment of the present disclosure.
Figure 12C:
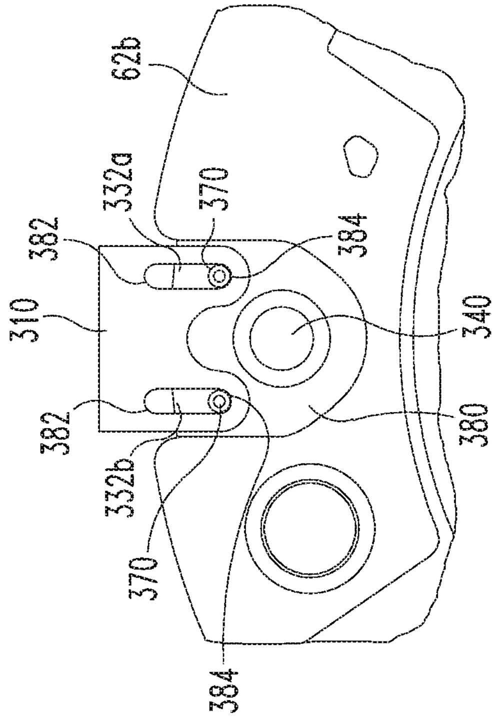
FIG. 12C is a side view of a portion of the slide clamp connected to an inner housing for the lock assembly of FIG. 12A.
Figure 12B:
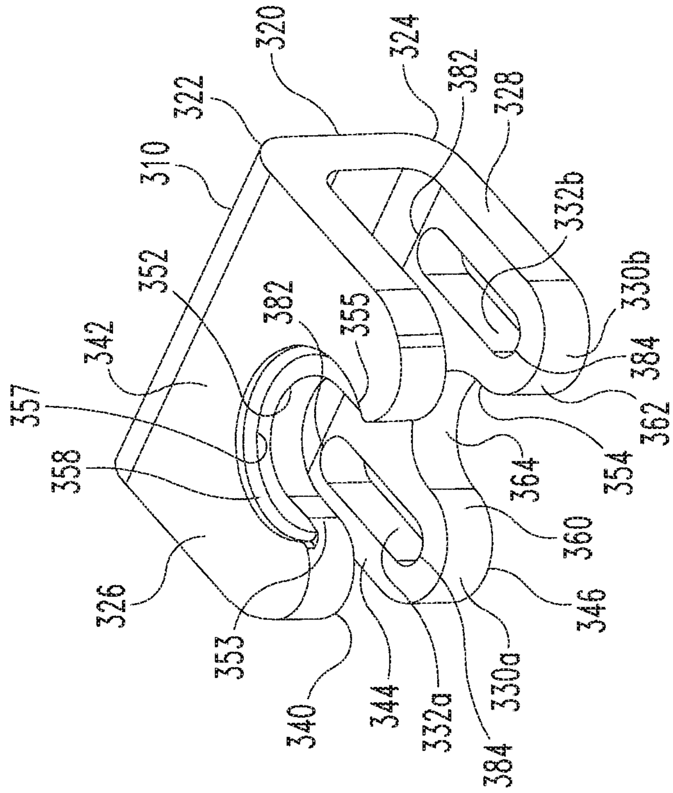
FIG. 12B is a perspective view of a slide clamp for the lock assembly of FIG. 12A.
Figure 12E:
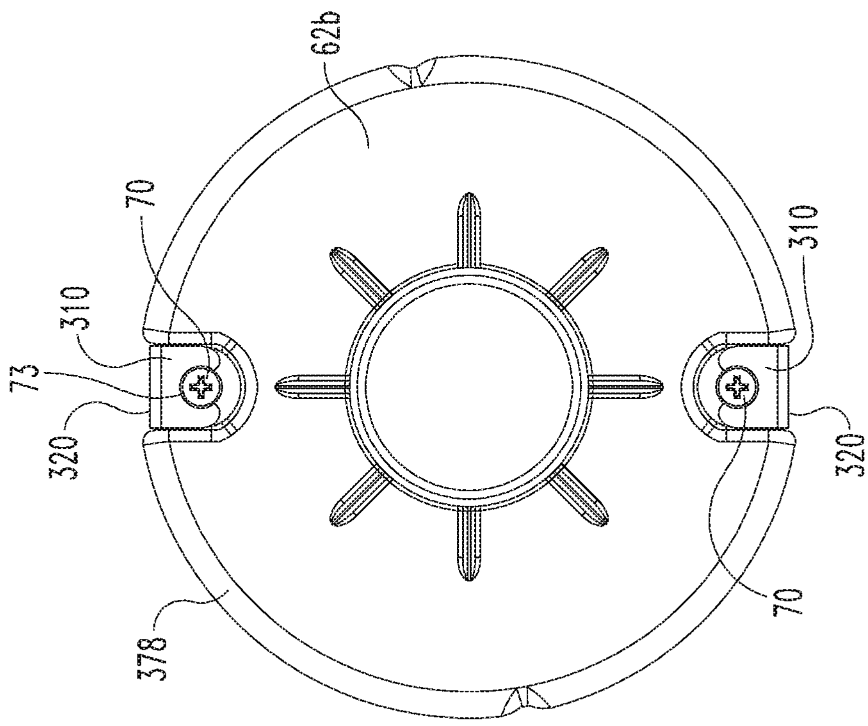
FIG. 12E is a top plan view of the inner housing with slide clamps in a closed position.
Figure 12D:
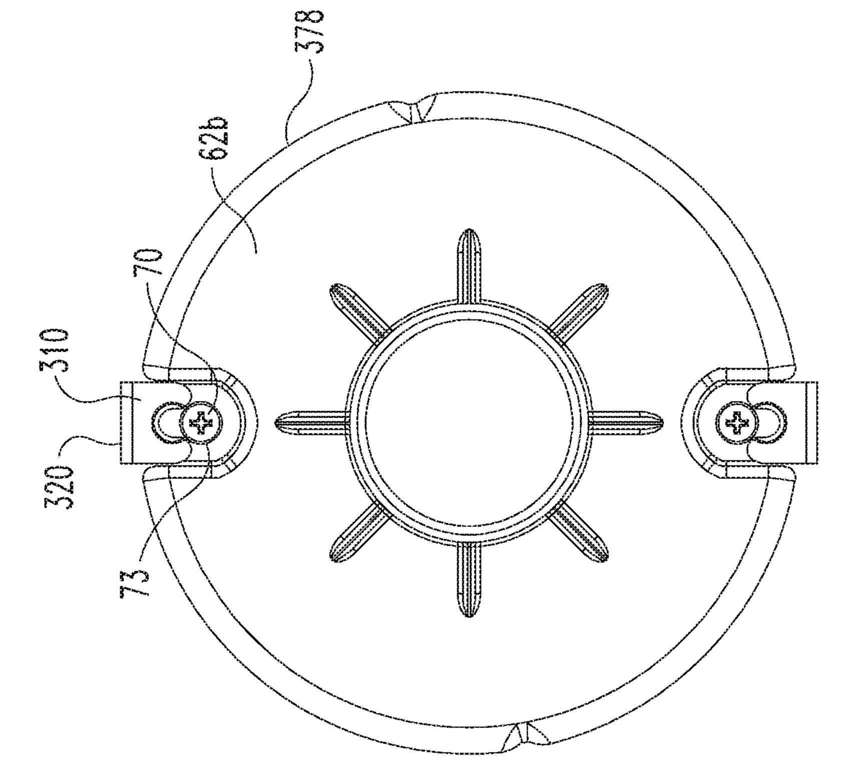
FIG. 12D is a top plan view of an inner housing with slide clamps in an open position.
Figure 13A:
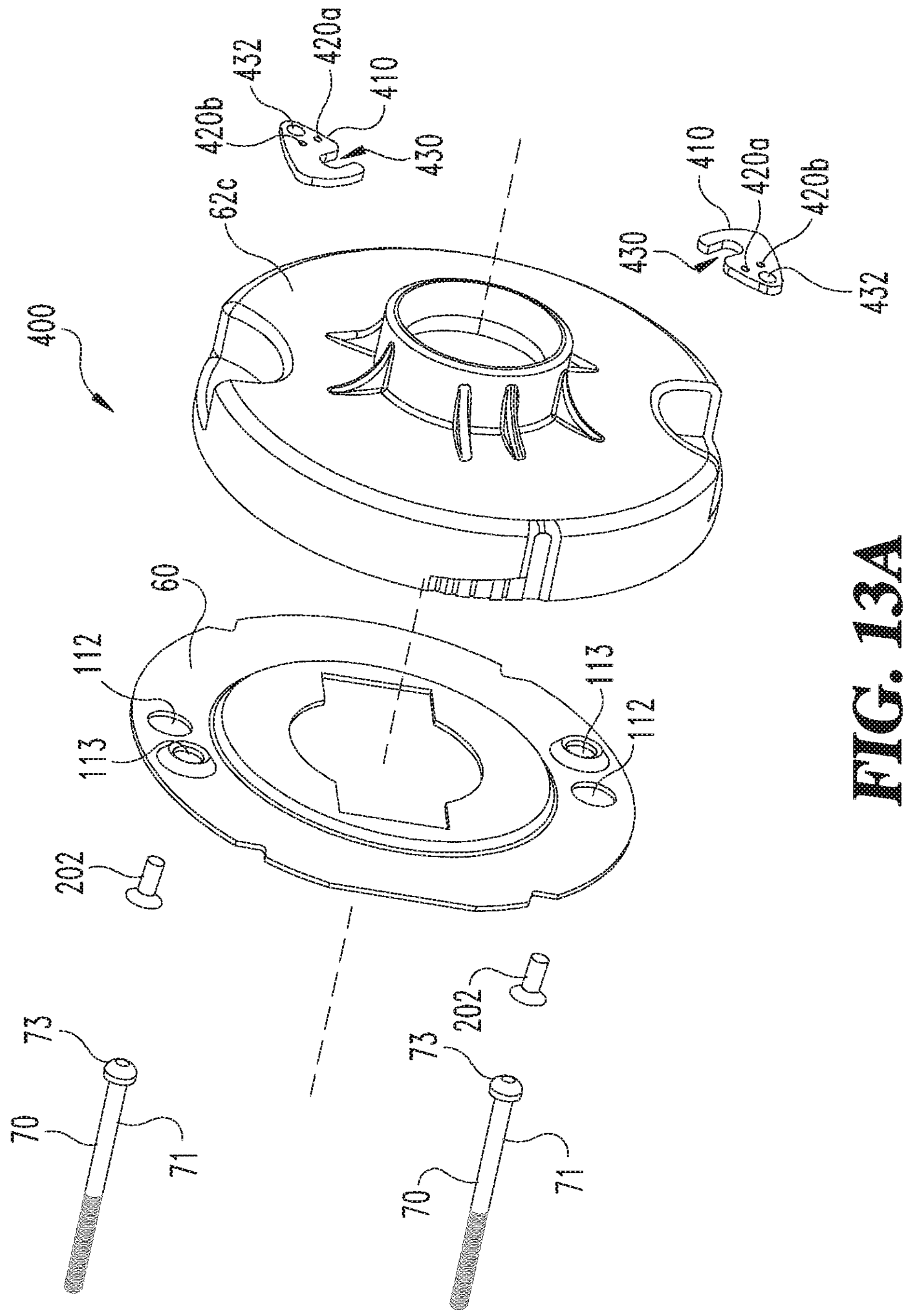
FIG. 13A is an exploded perspective view of a portion of a lock assembly according to another embodiment of the present disclosure.
Figure 13C:
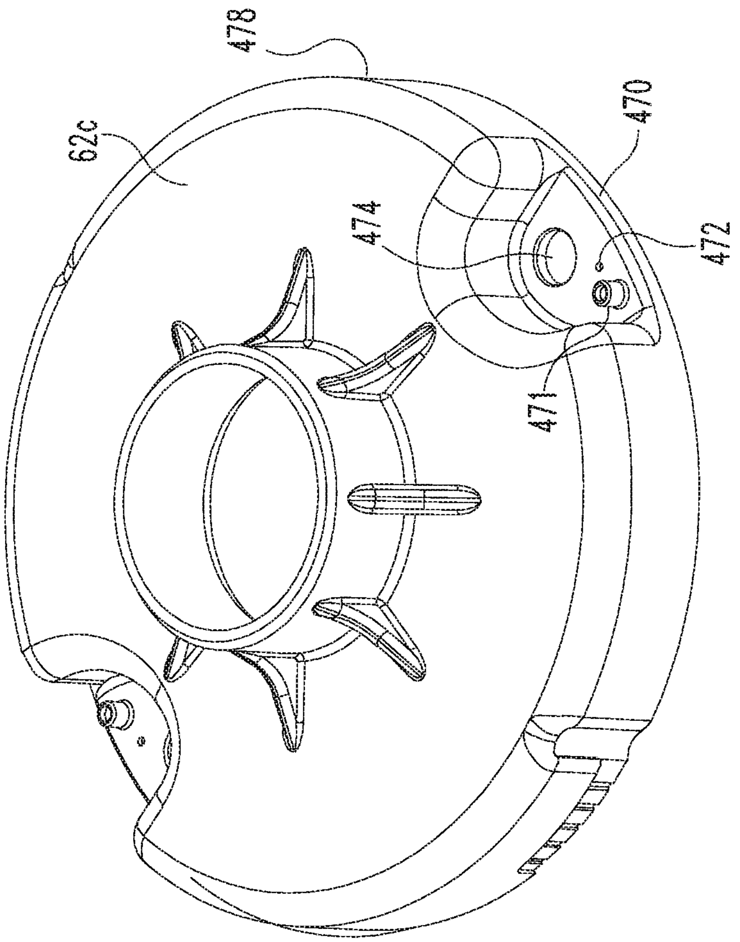
FIG. 13C is a perspective view of an inner housing for the lock assembly of FIG. 13A.
Figure 13B:
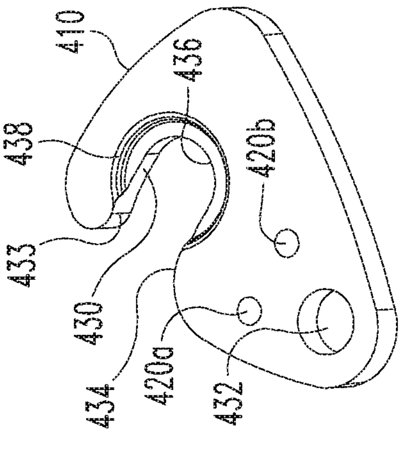
FIG. 13B is a perspective view of a pivot plate for the lock assembly of FIG. 13A.
Figure 13D:
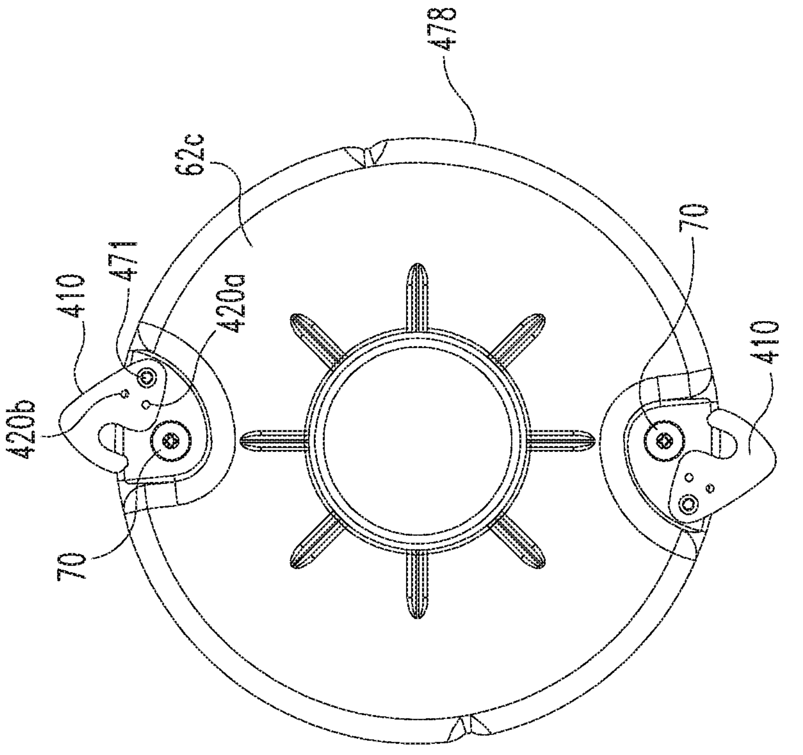
FIG. 13D is a top plan view of the inner housing with pivot plates in an open position.
Figure 13E:
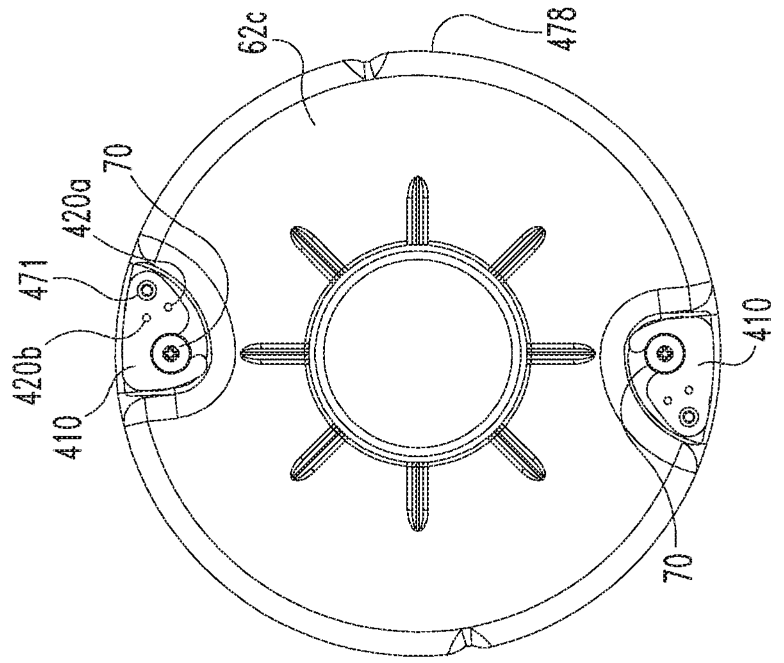
FIG. 13E is a top plan view of the inner housing with pivot plates in a closed position.

A pair of protrusions 370 can extend from a pocket connection region 380 of the inner housing 62*b*. The protrusions 370 are configured to engage within the guide slots 332*a*, 332*b* of the slide clamp 310 and operate to provide a guide and an end of travel abutment when either end 382, 384 of the guide slots 332*a*, 332*b* engages with the protrusions 370. The protrusions 370 can be created by pressing spring pins into holes in the inner housing 62*b* after assembly of the slide clamp 310 to the inner housing 62*b*. The slide clamp 310 is shown in an open position in FIG. 12D. In the open position, a head 73 of the fastener 70 can be positioned through the aperture 340 (see FIG. 12C) of the inner housing 62*b*. The slide clamp 310 can be moved radially inward to releasably lock the fastener 70 with respect to the inner housing 62*b* as shown in FIG. 12E. When the slide clamp 310 is open, the top wall 320 extends radially outward from an outer perimeter 378 of the inner housing 62*b* so as to prevent the escutcheon rose 64 from being installed therewith in similar fashion to other disclosed embodiments. In this manner, the slide clamp 310 provides a safety feature to prevent the lock assembly 300 from being assembled improperly.

Referring now to FIGS. 13A-13E, an exploded perspective view of a portion of a lock assembly 400 according to another embodiment is illustrated therein. The lock assembly 400 includes one or more pivot plates 410 operable to releasably connect one or more fasteners 70 to an inner housing 62*c* after passing through an inner plate 60. The one or more fasteners 70 can be threaded into the outer housing 100 (see FIG. 2) prior to insertion through the door 20 and the inner housing 62*c*.

The pivot plate 410 includes a first detent hole 420*a* spaced apart from a second detent hole 420*b* so as to provide semi-fixed positions of the pivot plate 410 in one of an open position and a closed position with respect to the inner housing 62*c*. The pivot plate 410 can include a slot 430 positioned proximate one end of the pivot plate 410 and a pivot aperture 432 formed at an opposing end thereof. The slot 430 can be defined by first and second opposing legs 433, 434 with an arcuate wall 436 extending between the legs 433, 434 to provide space for a fastener 70 to engage herein. A counterbore 438 can be formed on one side of the pivot plate 410 about the slot 430 so as to provide a space for the head of the fastener 70 to engage therein. The counterbore 438 can be shaped to prevent rotation of the pivot plate 410 once the fastener 70 is tightened into the counterbore 438 to clamp the lock assembly 400 to the door 20.

The inner housing 62*c* includes a pocket connection region 470 for the pivot plate 410 to pivotably engage therewith. A pivot pin 471 extends from the pocket connection region 470 and into the pivot aperture 432 of the pivot plate 410. The end of the pivot pin 471 can be deformed after assembly of the pivot plate 470 in order to attach the pivot plate 470 to the inner housing 62*c*. A detent bump or protrusion 472 extends from the pocket connection region 470 so as to engage with one of the detent holes 420*a* or 420*b* when the pivot plate 410 is in an open or closed position. When the detent bump 472 is positioned in detent hole 420*a*, the pivot plate 410 is held in an open position and when the detent bump 472 is engaged with the detent hole 420*b*, the pivot plate 410 is held in a closed position. The detent bump 472 provides enough resistance to hold the pivot plate 410 in a fixed position until the pivot plate 410 is intentionally moved from one of the open or closed positions. Similar to other embodiments, the pivot plate 410 extends outside of an outer perimeter wall 478 of the inner housing 62*c* in the open position which is effective to prevent complete assembly of the lock apparatus 400 prior to closing the pivot plates 410.

Referring now to FIGS. 14A-14E, an exploded perspective view of a portion of a lock assembly 500 according to another embodiment, is illustrated therein. The lock assembly 500 includes at least one slide plate 510 operable for holding a fastener 70 with respect to an inner housing 62*d*. Each fastener 70 can be threadingly engaged with the outer housing 100 and then extend through the aperture 112 in inner plate 60 and through an aperture 574 formed in the inner housing 62*d*, when the slide plate 510 is in an open position. The slide plate 510 includes a first elongate groove 532*a* and a second elongate groove 532*b* formed on either side thereof. Each of the elongate grooves 532*a*, 532*b* include first and second ends 534, 536 that operate as abutments or end stops to limit travel of the slide plate 510. The slide plate 510 further includes first and second detent holes 520*a* and 520*b* formed between the elongate grooves 532*a*, 532*b*. A slot 550 is configured to receive a portion of a fastener 70 that has passed through the aperture 574 of the inner housing 62*d*. The slot 550 is defined by first and second spaced apart legs 552, 554 with an arcuate portion 556 extending therebetween. A counterbore 558 configured to receive a portion of a head 73 of the fastener 70 can be formed about the slot 550. The counterbore 558 can be configured to prevent the slide plate 510 from sliding once the fastener 70 is tightened into the counterbore 558 to clamp the lock assembly 500 to the door 20.

The pocket connection region 570 is formed with the inner housing 62*d*. The pocket connection region 570 can include a detent protrusion 572 extending therefrom. The detent protrusion 572 is configured to engage with the detent holes 520*a* and 520*b* so that the slide plate 510 will remain in either an open position or closed position, respectively, without intentional movement of the slide plate 510.

Figure 14A:
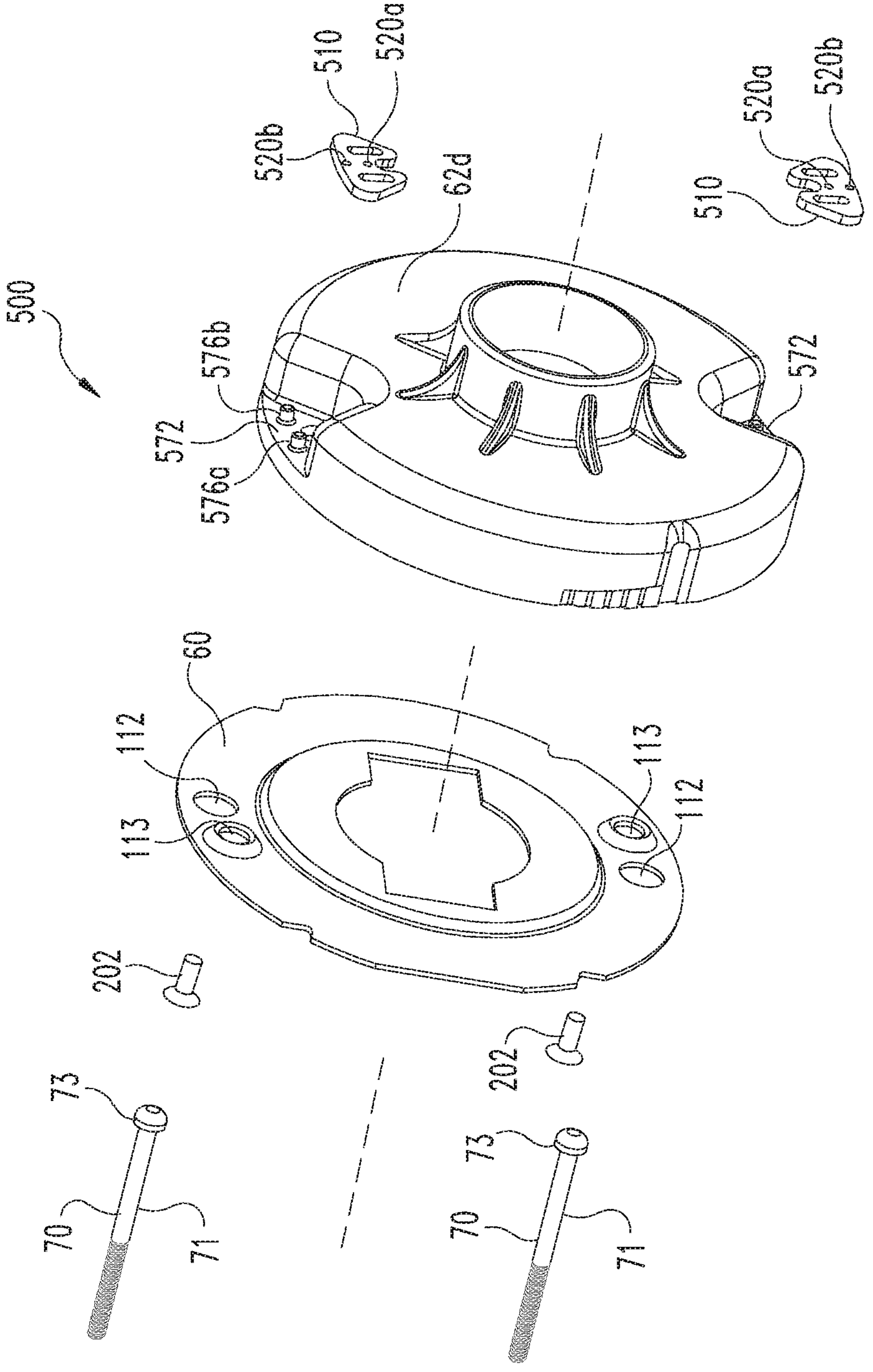
FIG. 14A is an exploded perspective view of a portion of a lock assembly according to another embodiment of the present disclosure.
Figure 14B:
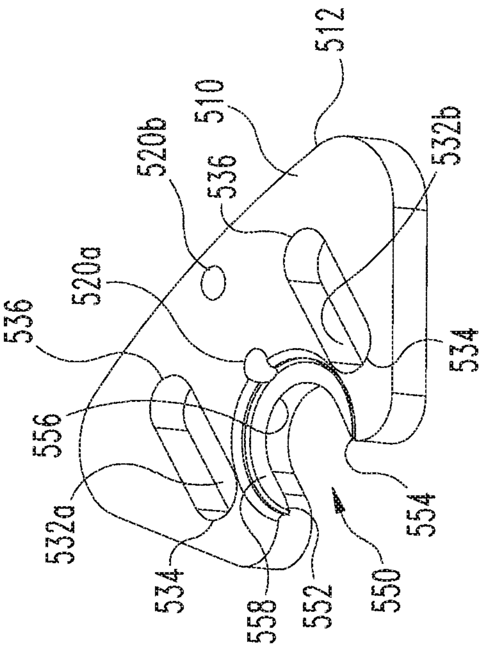
FIG. 14B is a perspective view of a slide plate for the lock assembly of FIG. 14A.
Figure 14C:
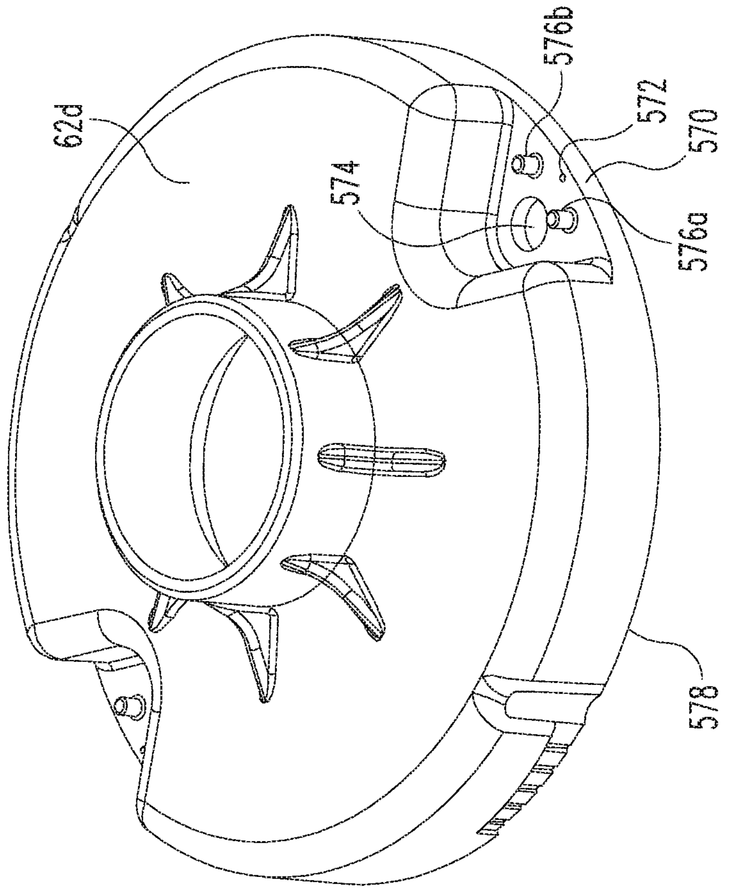
FIG. 14C is a perspective view of an inner housing for the lock assembly of FIG. 14A.
Figure 14E:
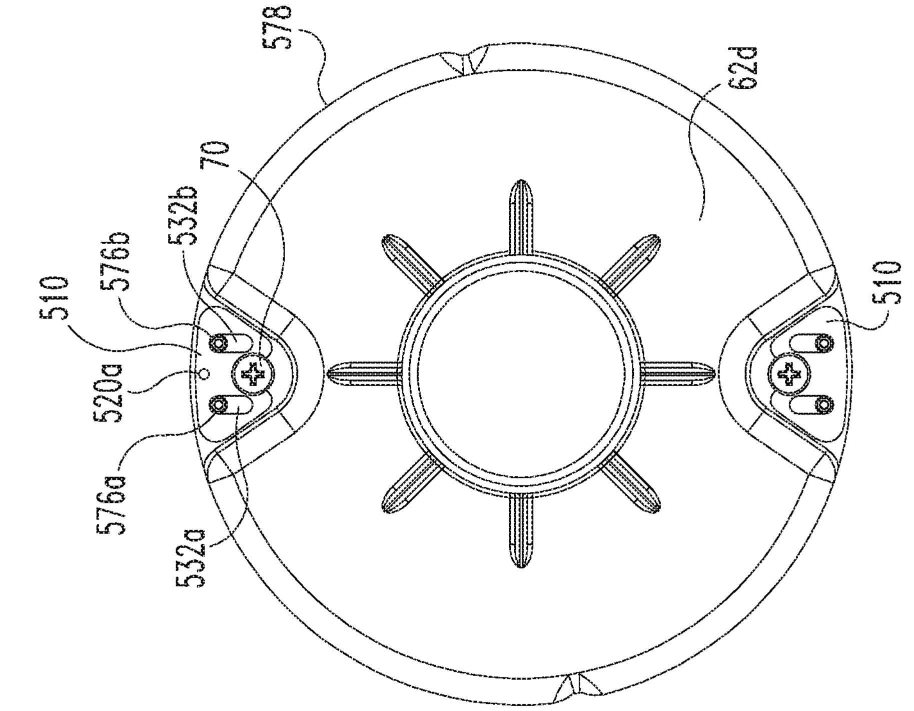
FIG. 14E is a top plan view of an inner housing with slide plates in a closed position.
Figure 14D:
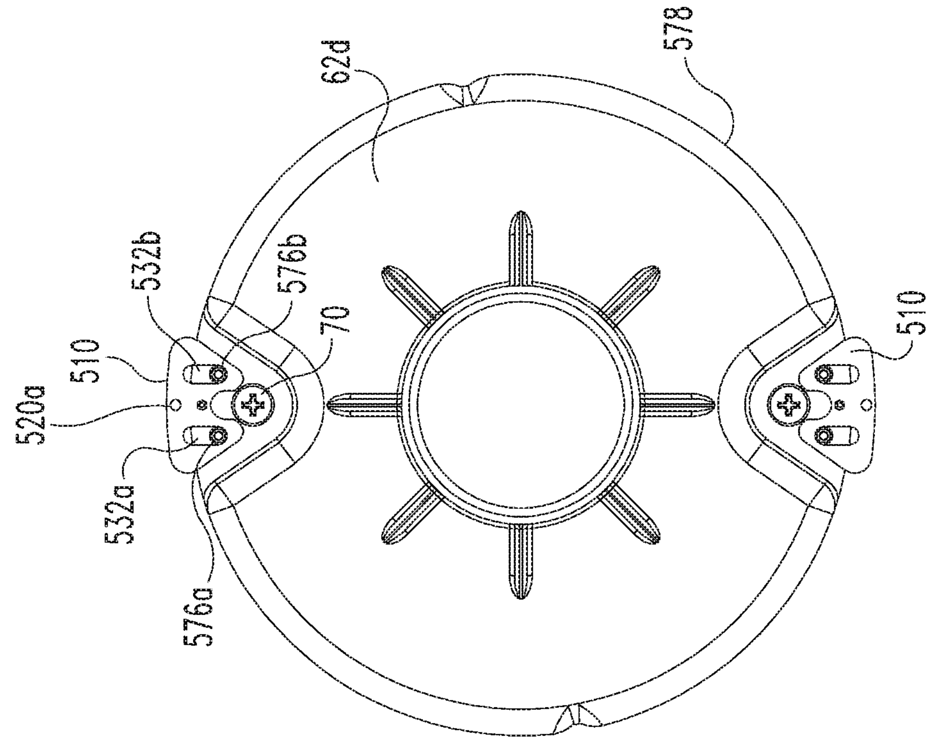
FIG. 14D is a top plan view of the inner housing with slide plates in an open position.

First and second slide pins 576*a* and 576*b* extend from the pocket connection region 570 on either side of the detent bump 572. The slide pins 576*a* and 576*b* are configured to engage through a portion of each of the first and second grooves 532*a*, 532*b* to provide a guide for the slide plate 510. The ends of the slide pins 576*a* and 576*b* can be deformed after assembly of the slide plate 510 to attach the slide plate 510 to the inner housing 62. In the open position, a top portion 512 of the slide plate 510 is positioned outside of the outer perimeter 578 of the inner housing 62*d* so that the fasteners 70 can be passed through the apertures of the inner housing 62*d* as shown in FIG. 14D. When the slide plate 510 is open, the escutcheon rose 64 cannot be assembled with the inner housing 62*d* as shown in FIG. 14D. The slide plate 510 can then be moved to the closed position which will releasably lock the fastener 70 with respect to the housing 62*d*. When the slide plate 510 is in a closed position, the top portion 512 of the slide plate 510 is positioned within the outer perimeter 578 of the inner housing 62*d* so that the escutcheon rose 64 can be positioned over the inner housing 62*d*.

Referring now to FIGS. 15A-15F, an exploded perspective view of a portion of a lock assembly 600 according to another embodiment is illustrated therein. The lock assembly 600 includes a turn plate 610 that is positioned on a threaded fastener 70 adjacent a head 73 thereof. The turn plate 610 may be attached to the fastener 70 via mechanical connection such as, without limitation, staking or deformation of the shank of the fastener 610 to retain the turn plate 610 axially, but still allow the turn plate 610 to rotate relative to the fastener 70. The turn plate 610 is configured to slide through an elongate aperture 620 formed in an inner plate 60*b* and through a turn aperture 650 formed in an inner housing 62*e*. When the turn plate 610 is in open position the shape of the slots 620, 650 permit the turn plate 610 to slide through the inner plate 60*b* and the inner housing 62*e*. After passing through the slots 620, 650, the turn plate 610 can be rotated 90 degrees to lock the turn plate 610 with respect to the inner housing 62*e*. In operation, the fasteners 70 are threadingly engaged to the outer housing 100 on an opposing side of a door 20 prior to sliding the head 73 and the turn plate 610 through the slots 620, 650 of the inner plate 60*b* and the inner housing 62*e*, respectively.

Figure 15A:
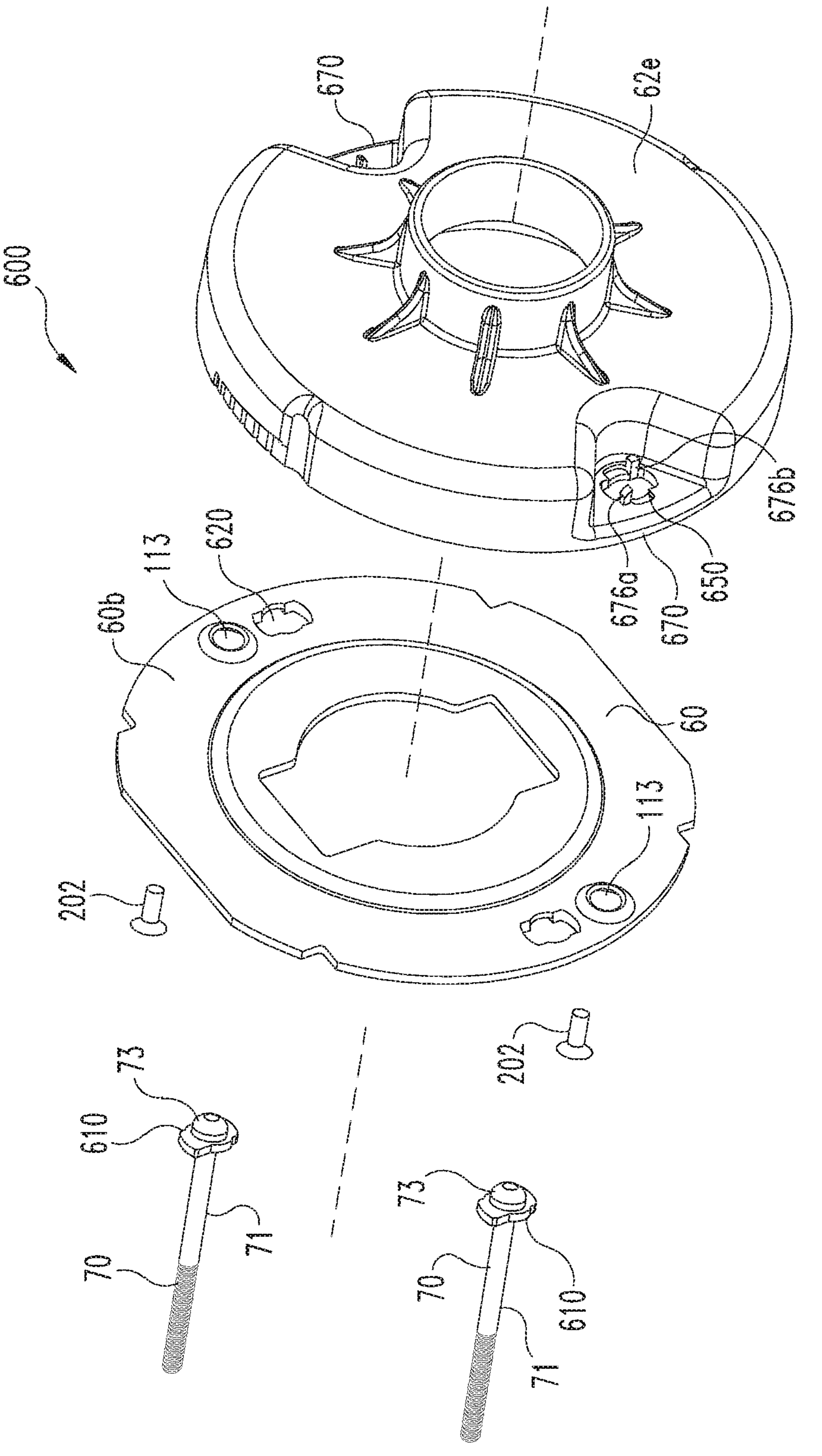
FIG. 15A is a perspective view of a portion of a lock assembly according to another embodiment of the present disclosure.
Figure 15C:
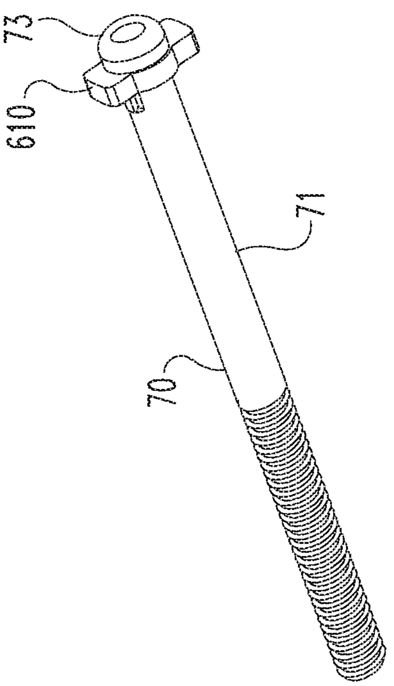
FIG. 15C is a perspective view of a fastener with the turn plate of FIG. 15B assembled therewith.
Figure 15B:
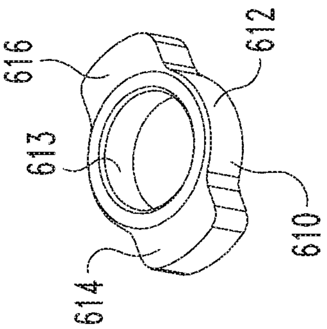
FIG. 15B is a perspective view of a turn plate for the lock assembly of FIG. 15A.
Figure 15D:
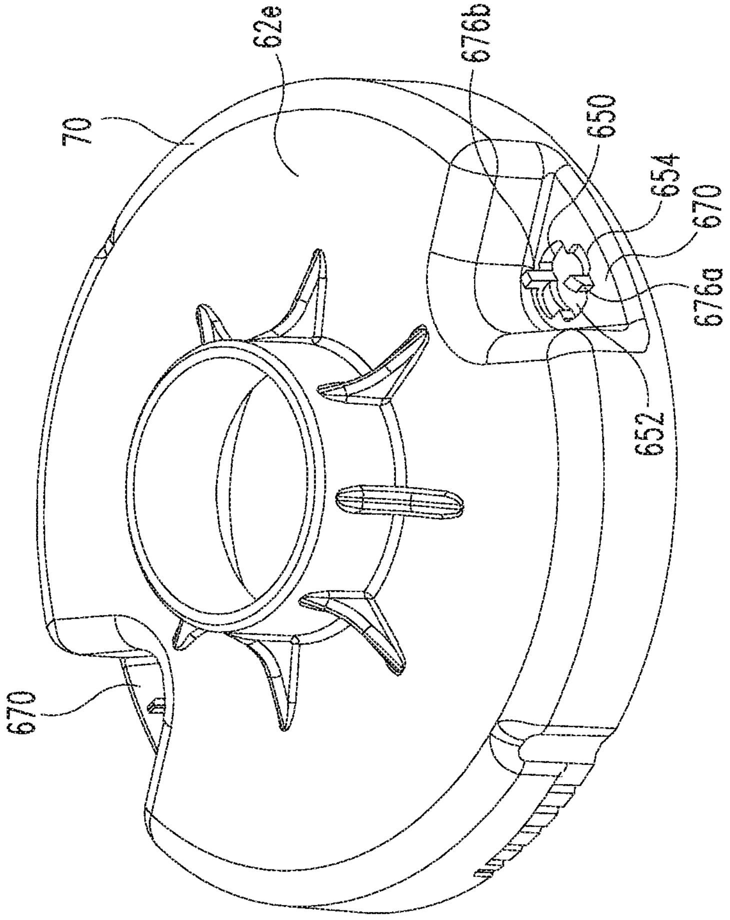
FIG. 15D is a perspective view of an inner housing for the lock assembly of FIG. 15A.
Figure 15F:
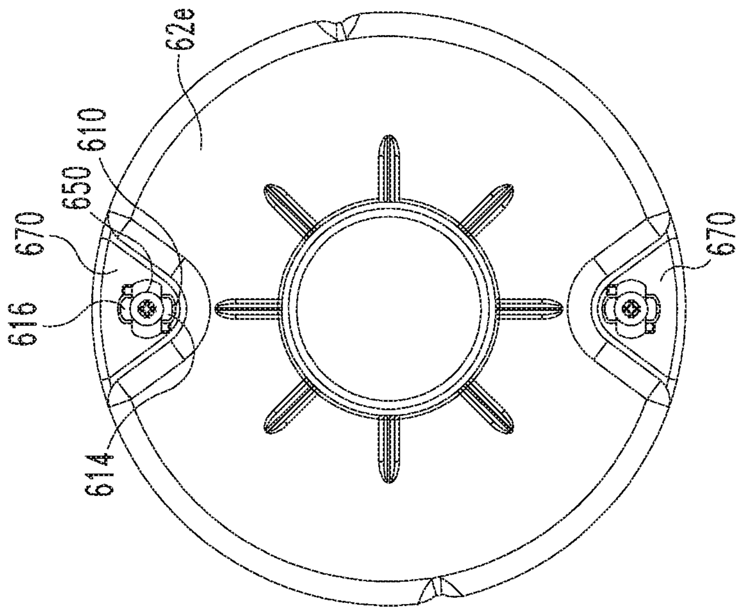
FIG. 15F is a top plan view of an inner housing with fasteners in a closed position.
Figure 15E:
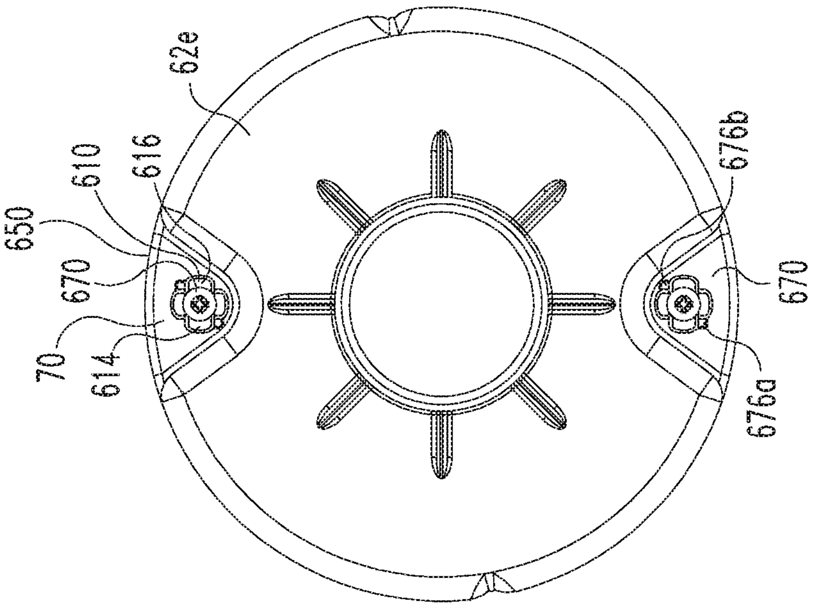
FIG. 15E is a top plan view of an inner housing with fasteners in an open position.

The turn plate 610 (best seen in FIG. 15B) is defined by a ring 612 that is shaped to receive a shank 71 of the fastener 70 therethrough. A first ear 614 and a second ear 616 extend outwardly from the ring 612. The inner housing 62*e* includes a pocket region 670 with the turn aperture 650 formed therethrough. The turn aperture 650 includes an aperture width 652 and an aperture height 654. The aperture width 652 is larger than the aperture height 654 thereby permitting the ears 614, 616 of the turn plate 610 to extend therethrough when aligned with the width 652. When the ears 614, 616 are rotated 90 degrees the turn plate 610 cannot slide back through the turn aperture 650 and thus lock the fasteners 70 to the inner housing 62*e*. A first stop pin 676*a* and a second stop pin 676*b* project outward from the pocket connection region 670 on opposing sides of the turn aperture 650. The stop pins 676*a*, 676*b* help align the turn plate 610 with the aperture height 654 while the fastener 70 is tightened to clamp the lock assembly 600 to the door 20. FIG. 15E shows the turn plate 610 in an open position such that the fastener 70 can be passed through the aperture 650 in the inner housing 62*e*. FIG. 15F shows the turn plate 610 in a closed position after rotating 90 degrees such that the ears 614, 616 interfere with the aperture height 654 (see FIG. 15D) of the turn aperture 650 to prevent unintended removal of the fastener 70 from the inner housing 62*e*.

One aspect of the present disclosure includes a lock assembly comprising: an inner housing positionable on one side of a structure; an outer housing positionable on an opposing side of the structure; a pocket connection region having an aperture formed through a wall of the inner housing; a fastener extendable through the aperture; a clamp device connected to the pocket connection region of the inner housing; wherein the clamp device pivots or slides between first and second positions; and wherein a head of a fastener freely passes through the aperture when the clamp device is in the first position and the head of the fastener is prevented from passing through the aperture when the clamp device is in the second position.

In refining aspects, the lock assembly includes a clamp device wherein the clamp device includes a top wall extending between first and second sidewalls; the clamp device comprising a hinge aperture formed in one of the first and second sidewalls of the clamp device; a pivot pin extending from a wall of the inner housing proximate the pocket connection region configured to connect with the hinge aperture of the clamp device; a rib extending through the pocket connection region of the inner housing; wherein the rib includes first and second opposing side walls to form a portion of the pocket connection region; wherein a width of the top wall of the clamp device is sized to provide a press fit between the side walls of the clamp device and the opposing sidewalls of the rib; wherein the press fit provides a resistance to unintentional pivoting of the clamp device from the second position to the first position; wherein the clamp device includes a first slot in the first side wall and a second slot in the second side wall; further comprising a counterbore formed with one of the first and second slots; wherein the counterbore is sized to receive a head of the fastener and prevent rotation of the clamp device after the fastener has been tightened into the counterbore; wherein each of the first and second slots include an arcuate end portion; wherein the arcuate end portion is sized to fit around a shank portion of the fastener; wherein the fastener is threaded into the outer housing prior to sliding the fastener through the structure and the aperture of the inner housing during assembly; and further comprising an escutcheon rose configured to engage over an outer perimeter wall of the inner housing when the clamp device is in the second position.

Another aspect of the present disclosure includes a lock assembly comprising: an inner housing positionable on one side of a structure; a pocket connection region having an aperture formed through a wall of the inner housing; an inner plate having a through aperture aligned with the aperture of the pocket connection region; a retainer positioned between the inner plate and the inner housing; a mounting fastener configured to slide through the aperture in the pocket connection region of the inner housing and through the retainer; and wherein the retainer holds the mounting screw in a fixed position with respect to the inner housing.

In refining aspects, the lock assembly includes a clamp device wherein the retainer includes a plurality of tabs extending radially inward from an outer perimeter; wherein the plurality of tabs are configured to engage with a threaded shank of the mounting fastener; and wherein the mounting fastener extends from the inner housing in the fixed position during assembly with an outer housing positioned on an opposing side of the structure.

Another aspect of the present disclosure includes a method comprising: coupling a threaded fastener to an inner housing of a lock assembly for a door; wherein the coupling includes positioning the threaded fastener in a fixed location with respect to the inner housing; and sliding the threaded fastener through an aperture in a door and threadingly engaging into an outer housing positioned on an opposing side of the door.

In refining aspects, the coupling includes retaining the threaded fastener in a desired position with respect to the inner housing during installation of the lock assembly; and wherein the sliding and threading occurs after the coupling of the fastener with a retainer and the inner housing.

It should be understood that the component and assembly configurations of the present disclosure can be varied according to specific design requirements and need not conform to the general shape, size, connecting means or general configuration shown in the illustrative drawings to fall within the scope and teachings of this patent application.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A lock assembly, comprising:

an inner housing positionable on one side of a structure;

an outer housing positionable on an opposite side of the structure;

a fastener attached to the outer housing; and a clamp device displaceable between first and second positions relative to the inner housing; and wherein the fastener is not clamped to the inner housing when the clamp device is in the first position; and wherein the fastener is clamped to the inner housing when the clamp device is in the second position.

2. The lock assembly of claim 1, wherein the clamp device pivots between the first and second positions.

3. The lock assembly of claim 2, wherein the clamp device is hinged to the inner housing by a pivot pin.

4. The lock assembly of claim 1, wherein the clamp device slides between the first and second positions.

5. The lock assembly of claim 1, wherein the clamp device comprises an aperture sized for receipt of a portion of the fastener;

wherein the fastener is not received in the aperture when the clamp device is in the first position; and wherein the fastener is received in the aperture when the clamp device is in the second position.

6. The lock assembly of claim 5, wherein the aperture comprises a slot having a side opening through which the fastener is received when the clamp device is displaced from the first position to the second position.

7. The lock assembly of claim 1, wherein the inner housing comprises a pocket connection region; and wherein the clamp device is connected to the pocket connection region of the inner housing.

8. The lock assembly of claim 1, wherein the inner housing comprises an aperture sized for receipt of the fastener;

wherein the fastener freely passes through the aperture when the clamp device is in the first position; and wherein the fastener is prevented from passing through the aperture when the clamp device is in the second position.

9. The lock assembly of claim 1, wherein the fastener comprises a head that is engaged with the clamp device when the clamp device is in the second position.

10. The lock assembly of claim 1, wherein the fastener is threadingly engaged to the outer housing.

11. The lock assembly of claim 1, further comprising an escutcheon rose configured to be positioned over an outer perimeter wall of the inner housing when the clamp device is in the second position.

12. A method, comprising:

coupling a threaded fastener to an inner housing of a lock assembly for a door, wherein the coupling includes positioning the threaded fastener in a fixed location with respect to the inner housing; and sliding the threaded fastener through an aperture in a door and threadingly engaging the threaded fastener with an outer housing positioned on an opposite side of the door.

13. The method of claim 12, wherein the coupling includes retaining the threaded fastener in a desired position with respect to the inner housing during installation of the lock assembly.

14. The method of claim 13, wherein the retaining of the threaded fastener in the fixed position occurs prior to the sliding and the threadingly engaging.

15. A method comprising:

attaching a fastener to an outer housing of a lock assembly, the outer housing located on a first side of a door;

inserting the fastener through an aperture in the door; and coupling the fastener with an inner housing positioned on a second side of the door opposite the first side, wherein the coupling includes moving a clamp device from an open position to a closed position that engages the fastener.

16. The method of claim 15, wherein the fastener comprises a threaded fastener; and wherein the attaching comprises threadingly engaging the threaded fastener to the outer housing.

17. The method of claim 16, further comprising tightening the threaded fastener into the outer housing when the clamp device is in the closed position.

18. The method of claim 15, wherein the moving comprises pivoting the clamp device between the open and closed positions.

19. The method of claim 15, wherein the moving comprises sliding the clamp device between the open and closed positions.

20. The method of claim 15, wherein the inner housing comprises an aperture sized for receipt of the fastener;

the method further comprising:

passing the fastener through the aperture when the clamp device is in the open position; and capturing the fastener in the aperture when the clamp device is in the closed position.

* * * * *